Aug. 20, 1929.  M. J. CODY ET AL  1,725,700

COTTER PIN

Filed June 3, 1927

INVENTOR.
Michael J. Cody
James I. Jobe

BY
U. G. Charles
ATTORNEY.

Patented Aug. 20, 1929.

1,725,700

UNITED STATES PATENT OFFICE.

MICHAEL J. CODY, OF COUNCIL GROVE, AND JAMES I. JOBE, OF TOPEKA, KANSAS.

COTTER PIN.

Application filed June 3, 1927. Serial No. 196,290.

Our invention relates to cotter pins.

The object of our invention is to provide a cotter pin that will open automatically at the ends as driven through an aperture.

A further object of our invention is to provide a cotter pin that can be applied to places where it is inconvenient to reach the ends to separate the same.

These and other objects will hereinafter be more fully explained.

Referring to the drawings:

Fig. 1 is a side view of a cotter pin.

Fig. 2 is a side view of the cotter pin entering an aperture, in a shaft.

Fig. 3 is a side view showing the shape of the pin when driven to its proper position in the aperture. In this view the pin is shown to be spread longitudinal with the shaft, which may be required, but however the pin may be turned as desired.

Fig. 4 is a cross sectional view of the pin taken on the line 4—4 in Fig. 1.

The cotter pin or key herein disclosed consists of a metal strip rectangular in section or semi-circular. We therefore do not wish to be confined to any particular shape sectionally.

Our improvement herein disclosed consists of a single piece of metal constituting a pin 1, the said metal being lapped back on itself having a curvature on one end as at A, and extending therefrom approximately parallel to the center of the pin as at B, and from thence converging to a point approximately as at C, at which point the legs 2 of the pin contact and extending parallel to the end thereof and in axial alignment with the opposite portion of the pin.

The pin thus made when driven through an aperture 3, which is diametrically or otherwise positioned through a shaft or the like as at 4, will contact at the end of the aperture as at D by reason of the divergence of the legs beginning at that point; and as driven through, the outer ends are free to separate as shown at E in Fig. 3, the separation being caused by forcing the parallel members together by driving the pin downward to near the looped end A as shown in Fig. 3. When so driven through, the parallel sides will contact as at F functioning as a fulcrum point by which means the legs of the pin diverge until they contact the opposite end of the aperture as at G.

It is now readily seen how the legs of the pin are automatically separated at the free ends functioning as a locking means to prevent said pin from freely retracting.

Note in Fig. 3 that the curvature as at C remains undisturbed, by which means the extreme outer ends of the legs are more widely separated. This position can be increased should the parallel portion starting from the curvature be increased in its width, and the aperture in which the pin engages increased in diameter to allow for the ends to separate before striking the opposite end of the aperture as it passes through.

The form of the pin herein disclosed will apply to a strip of metal of considerable width, and will function in like manner as the semi-circular form when being driven through a slot conforming to the section of the strip when doubled.

Such other modifications may be employed as lie within the scope of the appended claims.

Having thus described our invention, what we claim as new and desire to secure by Letters Patent is:—

1. In a cotter pin, a pin of the kind described, having a centrally disposed semi-circular bend so that the returned portion of the structure will be separated and approximately parallel to an oblique bend of both sides toward each other contacting so that a portion from the contact point to the outer end will fit snugly together in axial alignment with the structure, the snugly fitting portion adapted to engage in the aperture, the converging portion to contact at the end of the aperture by which means said portion is compressed toward each other as separating means for the outer end of the snugly engaging portion as the pin is driven through the aperture.

2. In a cotter pin, a cotter pin formed as described, the form consisting of a half circle centrally positioned to the cotter pin member, both ends of the pin member extending tangentially from the half circle and in parallelism to a spaced distance to a second bend, and from thence an oblique bend inward for each end portion to contact at a spaced distance, and from thence to the outer ends being parallel and in close contact, the last said end portions being flared by compressing the first said parallel portions toward each other by driving the pin through an aperture of slightly larger diameter than the cotter pin.

3. In a cotter pin as an article of manufacture, a cotter pin made from a single piece of material by a one-half circle bend of the same placed in the center, the outer ends snugly contacting for approximately one-third of the length of the pin, and diverging to a distance of approximately one-third of its length to a parallel portion tangentially extending from the half circle, the latter being approximately one-third, including the curvature of the half circle, the said pin adapted to engage in an aperture larger in diameter than the contacting outer end portions, by which means the outer ends of the said end portions will move from each other as the pin is driven through the aperture, the half circle functioning as a head to prevent further movement of the pin through the aperture.

In testimony whereof we affix our signature.

MICHAEL J. CODY.
JAMES I. JOBE.